United States Patent
Fukuda (10) Patent No.: US 8,938,539 B2
(45) Date of Patent: Jan. 20, 2015

(54) COMMUNICATION SYSTEM APPLICABLE TO COMMUNICATIONS BETWEEN CLIENT TERMINALS AND A SERVER

(75) Inventor: Reiji Fukuda, Tokyo (JP)

(73) Assignee: Chepro Co., Ltd., Tokyo (JP)

( * ) Notice: Subject to any disclaimer, the term of this patent is extended or adjusted under 35 U.S.C. 154(b) by 340 days.

(21) Appl. No.: 12/222,371

(22) Filed: Aug. 7, 2008

(65) Prior Publication Data

US 2009/0055472 A1 Feb. 26, 2009

(30) Foreign Application Priority Data

Aug. 20, 2007 (JP) ................................. 2007-213257

(51) Int. Cl.
*G06F 15/173* (2006.01)
*H04L 29/06* (2006.01)
*H04L 29/08* (2006.01)
*G06F 9/455* (2006.01)
*G06F 9/50* (2006.01)

(52) U.S. Cl.
CPC ............ *H04L 67/42* (2013.01); *H04L 67/1097* (2013.01); *G06F 9/45533* (2013.01); *G06F 9/5027* (2013.01)
USPC ........... 709/226; 709/219; 709/224; 709/225; 709/229; 711/6; 711/162; 711/203; 718/104; 718/106; 718/107

(58) Field of Classification Search
None
See application file for complete search history.

(56) References Cited

U.S. PATENT DOCUMENTS

| | | | | |
|---|---|---|---|---|
| 5,062,037 A * | 10/1991 | Shorter et al. | ................ | 718/100 |
| 5,555,385 A * | 9/1996 | Osisek | ............... | 711/1 |
| 5,799,320 A * | 8/1998 | Klug | .............. | 709/218 |
| 5,987,506 A * | 11/1999 | Carter et al. | ................. | 709/213 |
| 5,987,580 A * | 11/1999 | Jasuja et al. | ................. | 711/170 |
| 6,115,040 A * | 9/2000 | Bladow et al. | ............... | 715/741 |
| 6,463,459 B1 * | 10/2002 | Orr et al. | ....................... | 709/203 |
| 6,564,250 B1 * | 5/2003 | Nguyen | ...................... | 709/208 |
| 6,654,032 B1 * | 11/2003 | Zhu et al. | ..................... | 715/753 |
| 6,738,804 B1 * | 5/2004 | Lo | .................. | 709/219 |
| 6,865,732 B1 * | 3/2005 | Morgan | ....................... | 717/140 |
| 7,080,378 B1 * | 7/2006 | Noland et al. | ................ | 718/104 |
| 7,249,262 B2 * | 7/2007 | Hauck et al. | ................. | 713/184 |
| 7,383,332 B2 * | 6/2008 | Chong et al. | ................. | 709/224 |
| 7,444,410 B1 * | 10/2008 | Hichwa et al. | ............... | 709/228 |
| 2002/0029244 A1 * | 3/2002 | Suzuki et al. | ................ | 709/203 |
| 2002/0046188 A1 * | 4/2002 | Burges et al. | .................. | 705/67 |
| 2002/0053012 A1 * | 5/2002 | Sugimoto et al. | ................ | 712/1 |

(Continued)

FOREIGN PATENT DOCUMENTS

| CN | 1570904 A | 1/2005 |
|---|---|---|
| CN | 1599901 A | 3/2005 |

(Continued)

*Primary Examiner* — Ian N. Moore
*Assistant Examiner* — Dung B Huynh
(74) *Attorney, Agent, or Firm* — Dickstein Shapiro LLP (57) ABSTRACT

A communication system is applicable to communications between client terminals and a server via the Internet, and includes a communication service unit creating a communication interface and a memory region in response to a communication request from a client terminal via the Internet, starting an application program in the created memory region in response to the communication request, sending contents of the started application program to the client terminal, and updating data in the memory region and sending the updated data to the client terminal when the communication request includes data updating.

12 Claims, 6 Drawing Sheets

(56) References Cited

U.S. PATENT DOCUMENTS

| | | | |
|---|---|---|---|
| 2002/0069369 A1* | 6/2002 | Tremain | 713/201 |
| 2003/0055911 A1* | 3/2003 | Peterson | 709/217 |
| 2003/0055965 A1* | 3/2003 | Colby et al. | 709/225 |
| 2003/0101259 A1* | 5/2003 | Lu | 709/224 |
| 2003/0110263 A1* | 6/2003 | Shillo | 709/226 |
| 2003/0149754 A1* | 8/2003 | Miller et al. | 709/223 |
| 2004/0054763 A1* | 3/2004 | Teh et al. | 709/221 |
| 2004/0107236 A1* | 6/2004 | Nakagawa et al. | 709/200 |
| 2004/0215903 A1* | 10/2004 | Barri et al. | 711/148 |
| 2005/0022201 A1* | 1/2005 | Kaneda et al. | 718/104 |
| 2005/0055419 A1* | 3/2005 | Oh | 709/213 |
| 2005/0071596 A1* | 3/2005 | Aschoff et al. | 711/170 |
| 2005/0096933 A1* | 5/2005 | Collins et al. | 705/1 |
| 2005/0166209 A1* | 7/2005 | Merrick et al. | 719/310 |
| 2005/0289540 A1* | 12/2005 | Nguyen et al. | 718/1 |
| 2006/0089992 A1* | 4/2006 | Blaho | 709/227 |
| 2006/0161911 A1* | 7/2006 | Barrs et al. | 717/170 |
| 2007/0027896 A1* | 2/2007 | Newport et al. | 707/102 |
| 2007/0040021 A1* | 2/2007 | Nakayma | 235/380 |
| 2007/0078988 A1* | 4/2007 | Miloushev et al. | 709/227 |
| 2007/0162901 A1* | 7/2007 | Oh | 717/148 |
| 2007/0168634 A1* | 7/2007 | Morishita et al. | 711/170 |
| 2007/0214455 A1* | 9/2007 | Williams et al. | 718/1 |
| 2008/0089338 A1* | 4/2008 | Campbell et al. | 370/392 |
| 2008/0104608 A1* | 5/2008 | Hyser et al. | 718/105 |
| 2008/0162625 A1* | 7/2008 | Sedayao et al. | 709/202 |
| 2008/0235266 A1* | 9/2008 | Huang et al. | 707/102 |
| 2008/0301674 A1* | 12/2008 | Faus | 718/1 |
| 2009/0070444 A1* | 3/2009 | Fujino et al. | 709/222 |
| 2009/0204963 A1* | 8/2009 | Swart et al. | 718/1 |

FOREIGN PATENT DOCUMENTS

| | | |
|---|---|---|
| JP | 10-240605 | 9/1998 |
| JP | 2003-281101 A | 10/2003 |
| JP | 2005-51569 A | 2/2005 |

* cited by examiner

COMMUNICATION SYSTEM APPLICABLE TO COMMUNICATIONS BETWEEN CLIENT TERMINALS AND A SERVER

BACKGROUND OF THE INVENTION

1. Field of the Invention

This invention relates to communications between a server and client terminals.

2. Description of the Related Art

There are a lot of well-known data communication systems, each of which allows data communications between client terminals and a server via a LAN or a public network such as the Internet. Usually, such a communication system utilizes an application server provided with necessary application programs, and is configured to enable client terminals to activate the server in order to browse, input or update data.

When the Internet is used, an operator at the client terminal usually activates a browser, and runs an application program on a browser screen, and performs data communications. Japanese Patent Laid-Open Publication No. Hei 10-240605 has proposed such a data communication system.

The use of the browser for data communications would lead to a problem that the data are browsed, entered or updated by manipulating each browser screen. This means that a great amount of data should be transmitted and received, and that loads applied onto the Internet are increased. Sometimes, the data transmission and reception may not be executed with a good response. Further, the higher a usage rate of the Internet, the more often the data communication may not be carried out with a good response.

SUMMARY OF THE INVENTION

The present invention is intended to provide a communication system, a communication method, a communication control program and a communication program storing memory, which assure communications between a server and client terminals with good responses.

According to a first feature of the invention, a communication system is applicable to communications between client terminals and a server via the Internet. The system comprises a communication service unit creating a communication interface and a memory region in response to a communication request from a client terminal via the Internet, starting an application program in the created memory region in response to the communication request, sending contents of the started application program to the client terminal, and updating data in the memory region and sending the updated data to the client terminal when the request includes data updating.

In accordance with a second feature of the invention, a communication method is applicable to communications between client terminals and a server via the Internet. The method enables a communication service unit to create a communication interface and a memory region in response to a communication request from a client terminal via the Internet, to start an application program in the created memory region in response to the communication request, send contents of the started application program to the client terminals, and to update data in the memory region and to send the updated data to the client terminal when the request includes data updating.

According to a third feature of the invention, a communication control program is installed in a server, and enables the server to execute the following: creating a communication interface and a memory region in response to a communication request from a client terminal via the Internet, starting an application program in the created memory region in response to the communication request, sending contents of the started application program to the client terminals, updating data in the memory region, and sending the updated data to the client terminal when the communication request includes data updating.

The foregoing program is stored in a readable memory media.

In accordance with the invention, the communication service unit creates a communication interface and a memory region in response to a communication request from a client terminal via the Internet, runs the application program in the created memory region, and sends contents of the application program to the client terminal. When data updating is requested by the client terminal via the Internet, the communication service unit updates data in the memory region, and sends the updated data to the client terminal. Therefore, the data can be updated item by item but not page by page as in the related art, which is effective in reducing loads applied to the Internet, allowing data communications between the client terminal and the server with good responses, and improving the usability of the data communications.

DETAILED DESCRIPTION OF THE INVENTION

Figure 1:
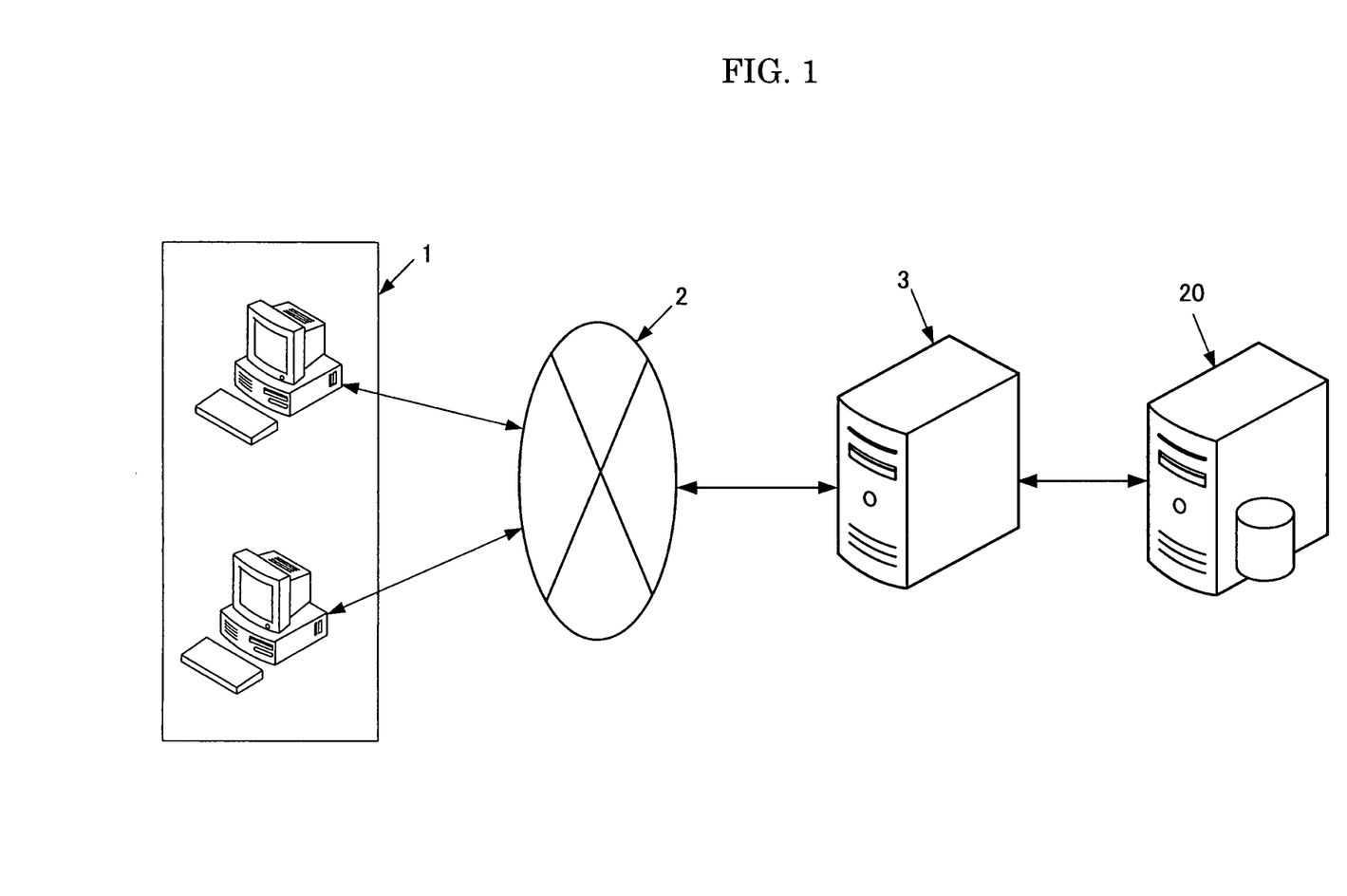
FIG. 1 shows an overall configuration of a communication system according to one embodiment of the invention.

The invention will be described with reference to one embodiment shown in the drawings. As shown in FIG. 1, a communication system is applied to data communications between client terminals 1 and a server 3 (i.e., an application server) via the Internet 2. A single client terminal or a plurality of client terminals may be connected to the server 3. The client terminals 1 may be PDAs (personal digital assistants), portable personal computers, portable phones and so on, which may be located away from the server 3.

Figure 2:
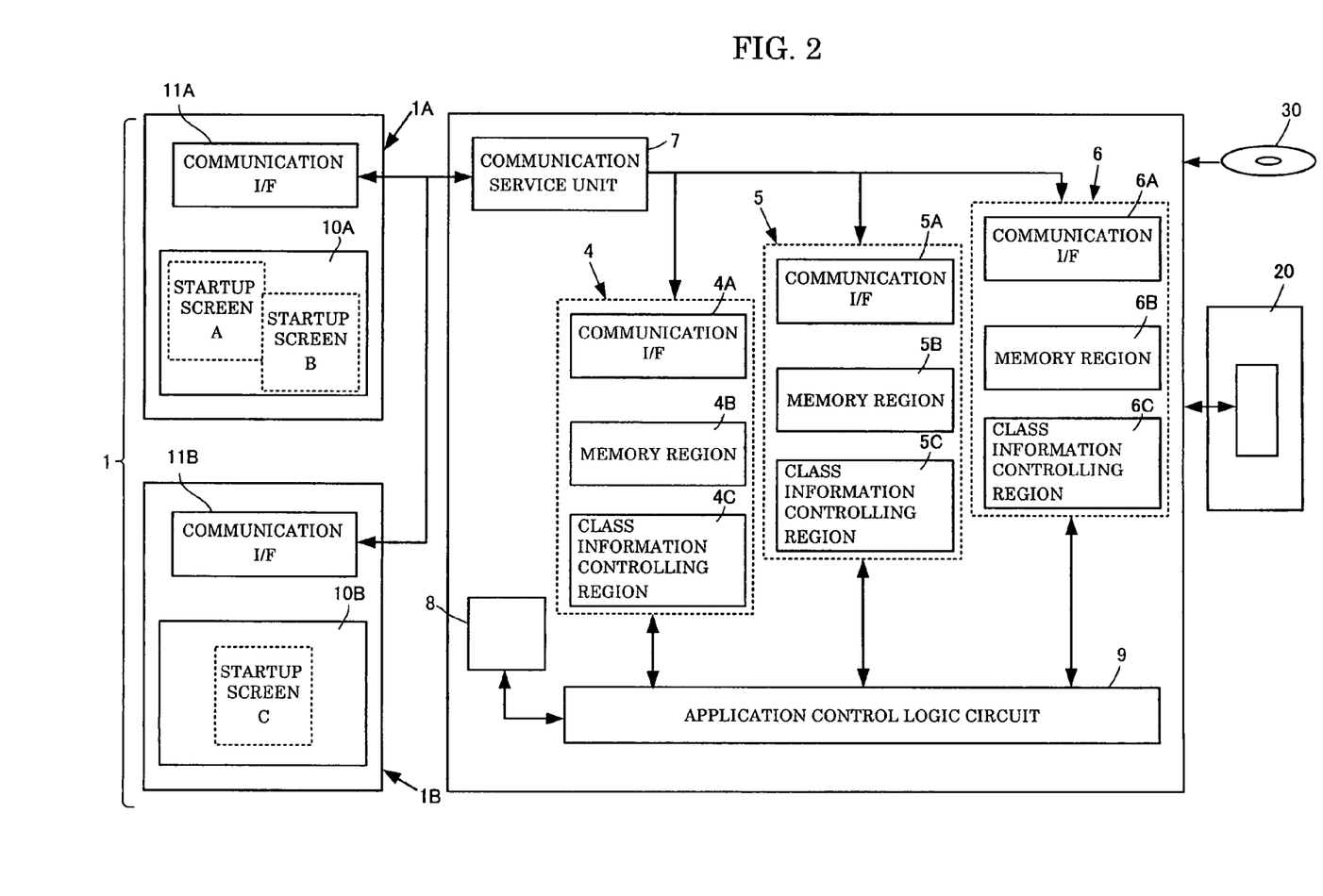
FIG. 2 is a block diagram showing a configuration of the communication system.

The server 3 is provided with a communication control program which is downloaded from a recording medium 30 such as an optical disc, or which is downloaded via the Internet 2. Referring to FIG. 2, the server 3 is configured to executes the following in response to communication requests from the client terminal 1 via the Internet: creating, in a memory (not shown), not only communication interfaces 4A, 5A and 6A (called the "communication I/F") but also memory regions 4B, 5B and 6B; selecting application programs to be used for the memory regions; sending contents of the selected application programs to the client terminals 1; updating data in the memory regions 4B, 5B and 6B when the communication request sent via the Internet 2 includes data updating; sending the updated data to the client terminals 1; and creating class information controlling regions 4C, 5C and 6C for controlling a database server 20.

It is assumed for descriptive purposes that two client terminals 1A and 1B are present in this embodiment. Further, it is assumed that three different communication requests are sent to the server 3 from the client terminals 1A and 1B, and that three communication I/Fs 4A, 5A and 6A and three memory regions 4B, 5B and 6B are created. When one communication request is made, only one communication I/F and only one memory region will be created. The client terminals 1A and 1B are configured by well-known computers, each of which comprises a CPU, a ROM, a RAM, a timer, a hard disc, a monitor 10A (or 10B), and a communication I/F 11A (or 11B). Each of the client terminals 1A and 1B has a communication program in order to gain access to the server 3. An operator at each client terminal runs the communication program in order to send and receive data to and from the server 3.

The server 3 is accessible to the database server 20. Needless to say, the server 3 and database server 20 may function as one unit. The server 3 has a well-known configuration, and includes: a CPU, a ROM, a RAM, a timer and so on; a communication service unit 7; a hard disc 8 storing application programs; and an application control logic circuit 9.

The communication service unit 7 is connected to the Internet 2, and transmits and receives data to and from the communication I/Fs 11A and 11B of the client terminals 1A and 1B. In response to the communication requests from the client terminals 1A and 1B via the Internet 2, the communication service unit 7 creates the communication I/Fs 4A, 5A and 6A, and the memory regions 4B, 5B and 6B, runs application programs in the memory regions 4B, 5B and 6B in accordance with the communication requests, and sends the contents of the application programs to the client terminals 1A and 1B. When the client terminals 1A and 1B request data updating, the communication service unit 7 updates data in the memory regions 4B, 5B and 6B, and sends the updated data to the client terminals 1A and 1B.

Specifically, the communication service unit 7 functions: to control reception of communication requests from the client terminals 1A and 1B via the communication I/Fs 11A and 11B; to process errors caused by data dropout or errors caused in a communication path when no communication can be established in spite of the communication requests; to connect the server 3 to the communication I/Fs 4A, 5A and 6A in response to the communication requests, and transfer the data to the communication I/Fs 4A, 5A and 6A; to determine which the communication I/Fs 4A, 5A and 6A or the communication I/Fs 4B, 5B and 6B should be used to meet the communication requests; to send contents processed by the server 3 to the communication I/Fs 11A and 11B; to select the communication I/F 4A, 5A or 6A, and the memory region 4B, 5B or 6B in accordance with the communication requests; and to create communication I/Fs and memory regions in the server 3 in response to new communication requests from the client terminals 11A and 11B.

Further, the communication service unit 7 balances loads caused by the communication requests from a plurality of client terminals 1, efficiently responds to the communication requests, and performs communications using encrypted data in order to prevent data leakage in the Internet 2. Still further, the communication service unit 7 checks a module version of the application program used by the client terminals 1 for a communication request. If the module version differs from a version administered by the server 3, the communication service unit 7 downloads the latest version to the client terminals 1.

The term "communication requests" from the client terminals 1 covers communications with the server 3, authentication information such as log-in IDs and passwords, and data for running application programs. The communication requests include information for identifying the client terminals. On the basis of the communication requests, the communication service unit 7 identifies the client terminals, and executes a variety of processes related to the communication requests.

The application control logic circuit 9 runs the application programs stored in the hard disc 8 of the server 3 and checks their statuses, creates class information controlling regions 4C, 5C or 6C, and writes in the data from the database server 20, reads out the data, and updates the data. The database server 20 has a well-known configuration, and includes a CPU, a ROM, a RAM, a timer, a hard disc and so on. The database server 20 stores, in its hard disc, data tables corresponding to the application programs installed in the server 3, and the authentication information of the client terminals. The database server 20 writes in, reads and updates the data as required by the application control logic circuit 9, Processes executed by the communication system will be described with reference to the flowcharts shown in FIG. 3 to FIG. 6.

Figure 3:
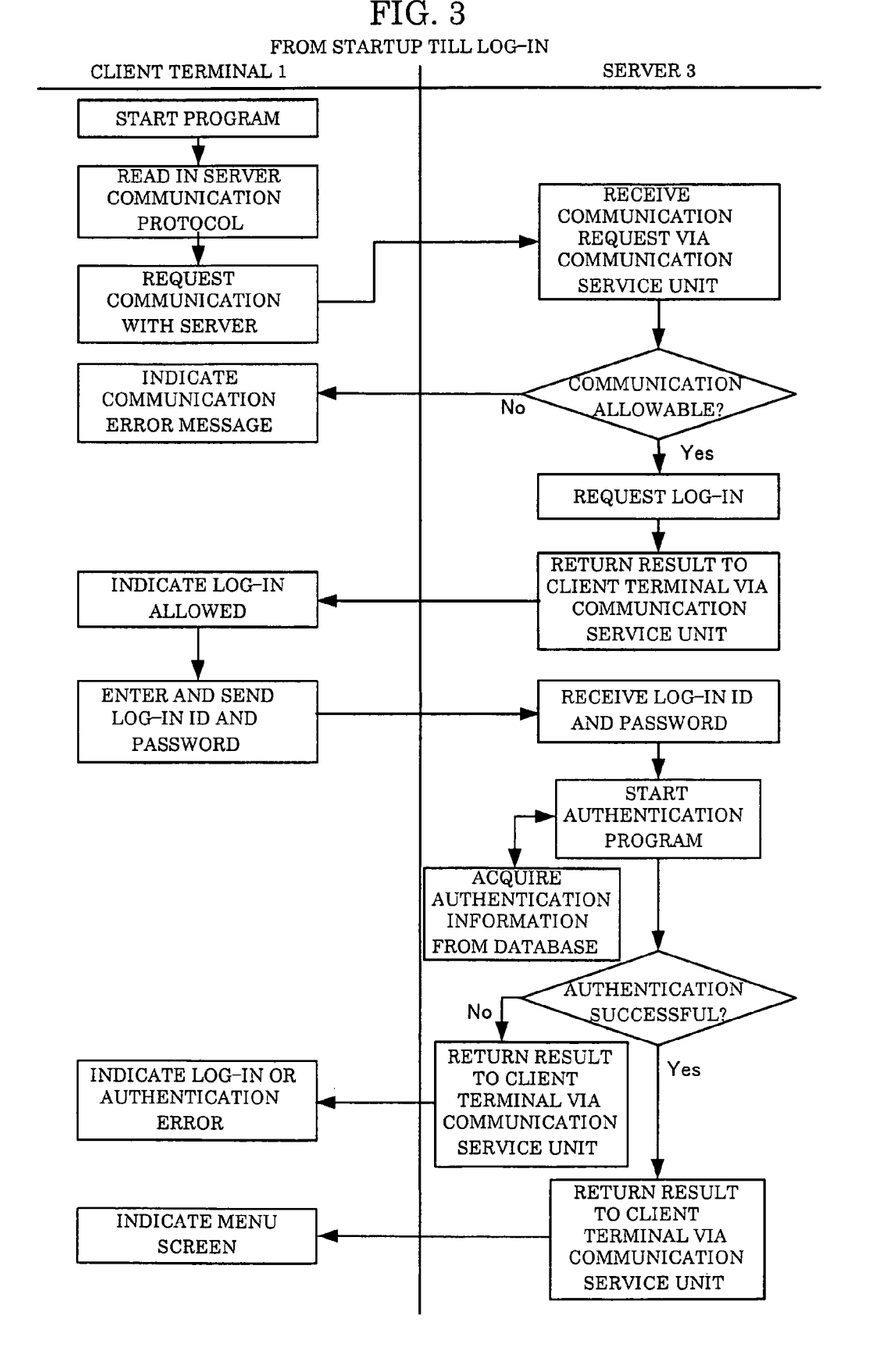
FIG. 3 is a flowchart showing a process executed between a startup and log-in of the communication system.

FIG. 3 shows a process for the client terminals 1 to log in the server 3. Specifically, the client terminal 1 runs the communication program, loads a communication protocol into the server 3, and sends a communication request to the server 3.

The server 3 receives the communication request from the client terminal 1 via the communication service unit 7, and figures out whether or not a communication is allowable. If the Internet 2 or the like happens to be disconnected on the way, the communication cannot be established. In such a case, the server 3 sends the client terminal 1 a communication error message, which will be shown on a monitor of the client terminal 1.

On the contrary, when the communication is confirmed to be allowable, the communication service unit 7 assumes that there is a login request, and informs the client terminal 1 of the allowed communication. Then, a login screen appears on the monitor of the client terminal 1, which urges the operator at the client terminal 1 to enter his or her login ID and password. When a SEND button (not shown) or an OK button (not shown) is pressed, the login ID and password will be transmitted to the server 3.

The database server 20 retains the client terminal information, login ID and password which have been correlated. The server 3 receives the login ID and password from the client terminal 1 via the communication service unit 7. The application control logic circuit 9 starts an authentication program, receives authentication information from the database server 20, and authenticates the client terminal 1. Once the client terminal 1 is authenticated, the communication service unit 7 transmits an authentication result to the client terminals 1. A main menu screen appears on the monitor of the client terminal 1. Conversely, a result of unsuccessful authentication is sent to the client terminal 1, and a login error will be shown on the monitor of the client terminal 1.

Figure 4:
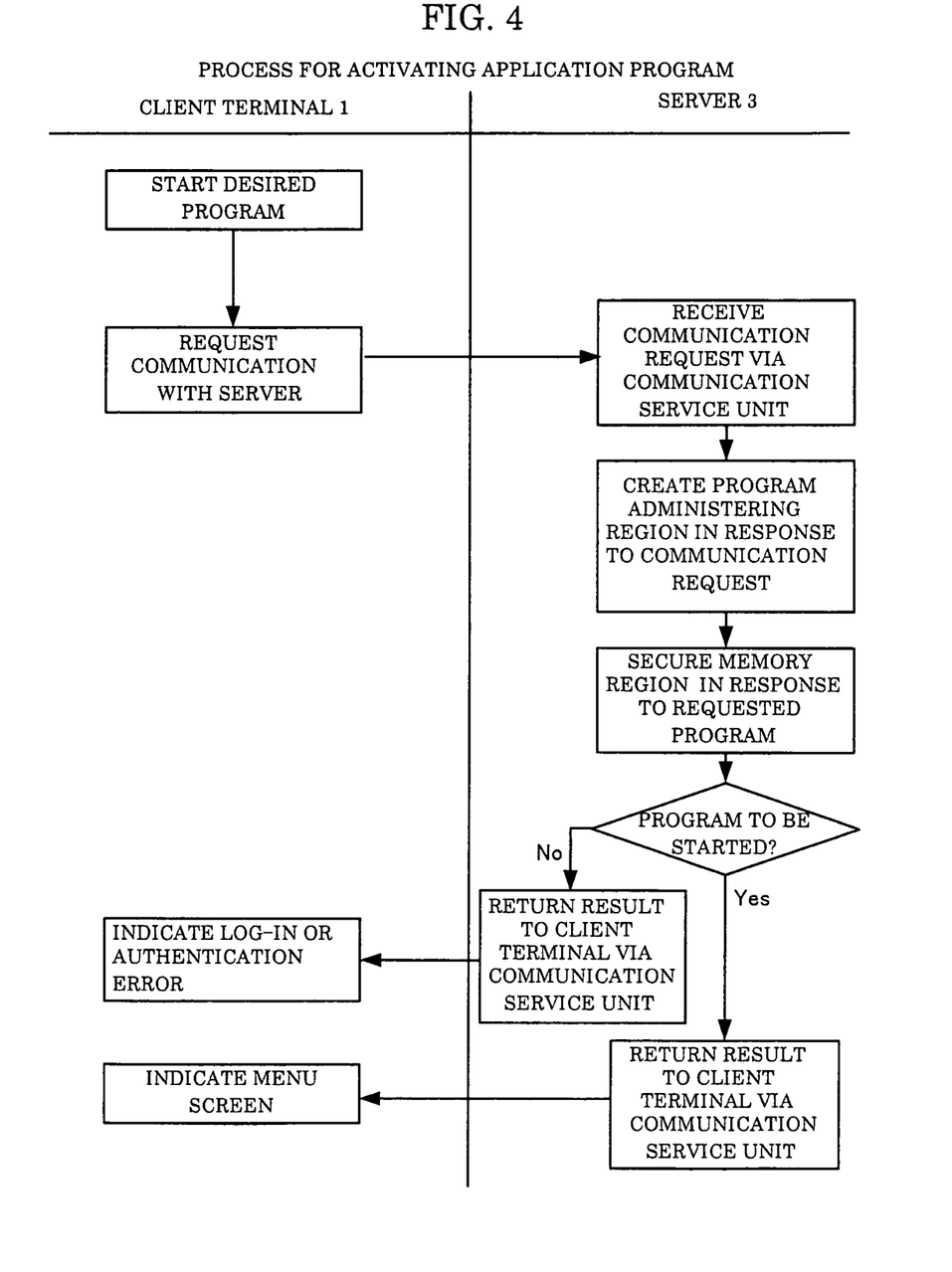
FIG. 4 is a flowchart showing a process for activating an application program in the communication system.

FIG. 4 shows a process for activating an application program by manipulating the main menu on the monitor of the client terminal 1.

At the client terminal 1, the operator selects a desired application program using the main menu on the monitor, and presses the SEND button (not shown), so that a communication request will be sent to the server 3. Receiving the communication request via the application service unit 7, the server 3 creates a program administering region therein, secures a memory region in accordance with the selected application program, and activates the application program in the memory region. If a startup screen A of the client terminal 1A (shown in FIG. 1) is manipulated, an administrative region 4 and the memory region 4B are created in the memory of the server 3. If a startup screen B of the client terminal 1A is manipulated, an administrative region 5 and the memory region 5B are created in the memory of the server 3. Further, if a startup screen C of the client terminal 1B is manipulated, an administrative region 6 and the memory region 6B are created in the memory of the server 3.

The application control logic circuit 9 checks the startup of the application program. When the startup is successful, the communication service unit 7 notifies the client terminal 1 that the startup is successful. A screen of the application program started in the memory region will appear on the monitor of the client terminal 1. In short, the application program on the monitor of the client terminal 1 is identical to that started by the server 3. On the contrary, if the application program is not started, the communication service unit 7 provides the client terminal 1 with a message representing unsuccessful startup of the application program. The message will appear on the monitor of the client terminals 1.

Figure 5:
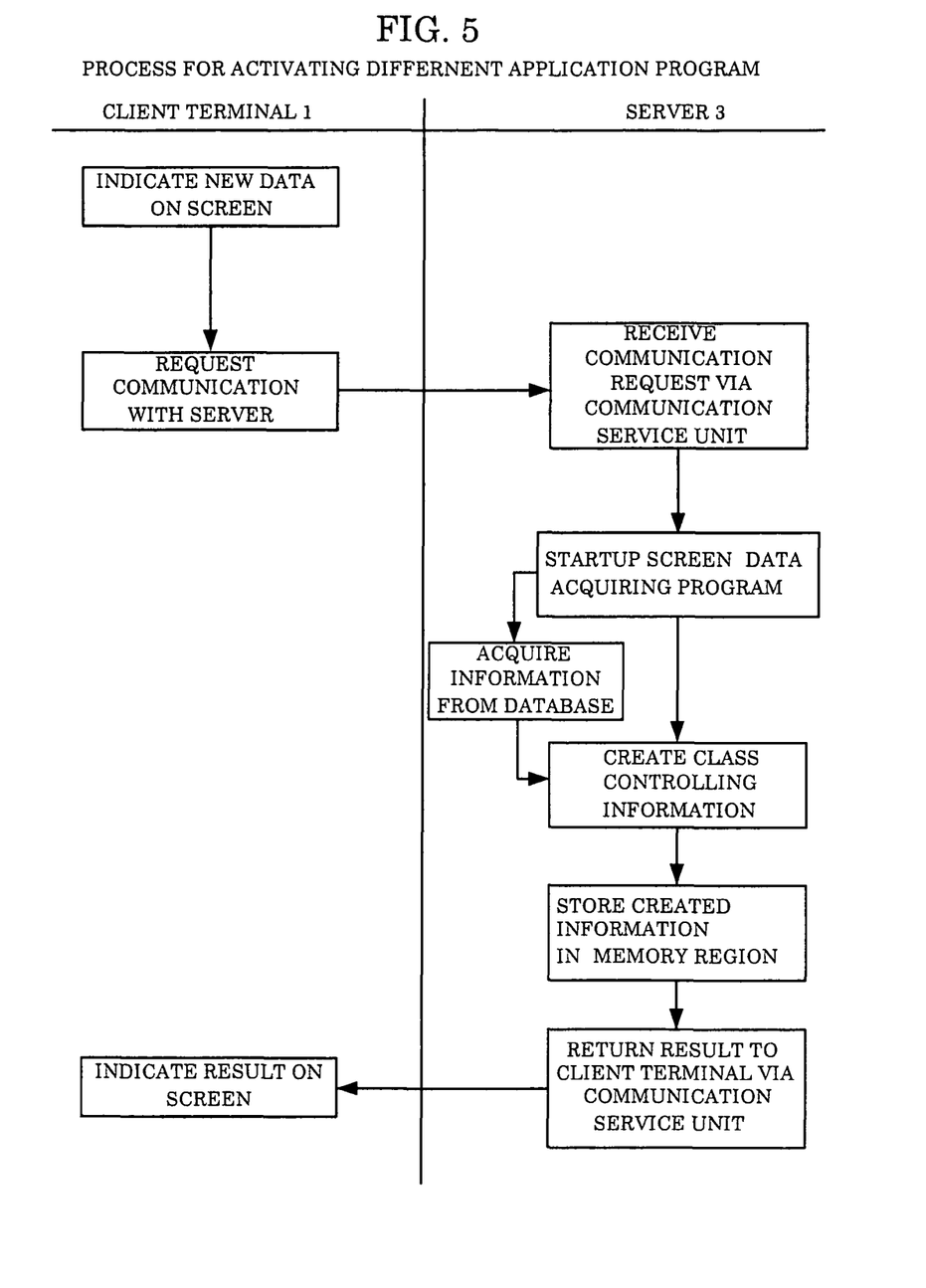
FIG. 5 is a flowchart showing a process for activating a different application program.

FIG. 5 shows a process for activating a different application program by manipulating the monitor of the client terminal 1 in order to update data. At the client terminal 1, the operator enters new data on the monitor in order to conduct a search under new conditions, and presses the SEND button or OK button (not shown). The new data, i.e. a communication request, will be sent to the server 3 via the communication service unit 7. The application control logic circuit 9 acquires the new data in the communication request, creates a class information controlling region in each administrative region, and acquires necessary information from the database server 20. For instance, when the startup screen A of the client terminal 1A is manipulated, the class information controlling region 4C is created in the administrative region 4. When the startup screen B of the client terminal 1A is manipulated, the class information controlling region 5C is created in the administrative region 5. Further, when the startup screen C of the client terminal 1B is manipulated, the class information controlling region 6C is created in the administrative region 6.

The data acquired from the database server 20 are stored in the corresponding memory region 4, 5 or 6. Contents of the stored data are returned to the client terminal issuing the communication request. The monitor of the client terminal shows the data laid out in memory region of the server 3.

In short, the data relevant to the communication request from the startup screen A of the client terminal 1A are stored in the memory region 4B. The communication service unit 7 returns the contents of the stored data to the client terminal 1A, so that they are shown on the monitor of the client terminal 1A. The data relevant to the communication request from the startup screen B of the client terminal 1A are stored in the memory region B. The communication service unit 7 returns the contents of the stored data to the client terminal 1A, so that they are shown on the monitor of the client terminal 1A. Similarly, the data relevant to the communication request from the startup screen C of the client terminal 1B are stored in the memory region 6B. The communication service unit 7 returns the contents of the stored data to the client terminal 1B, so that they are shown on the monitor of the client terminal 1B.

Figure 6:
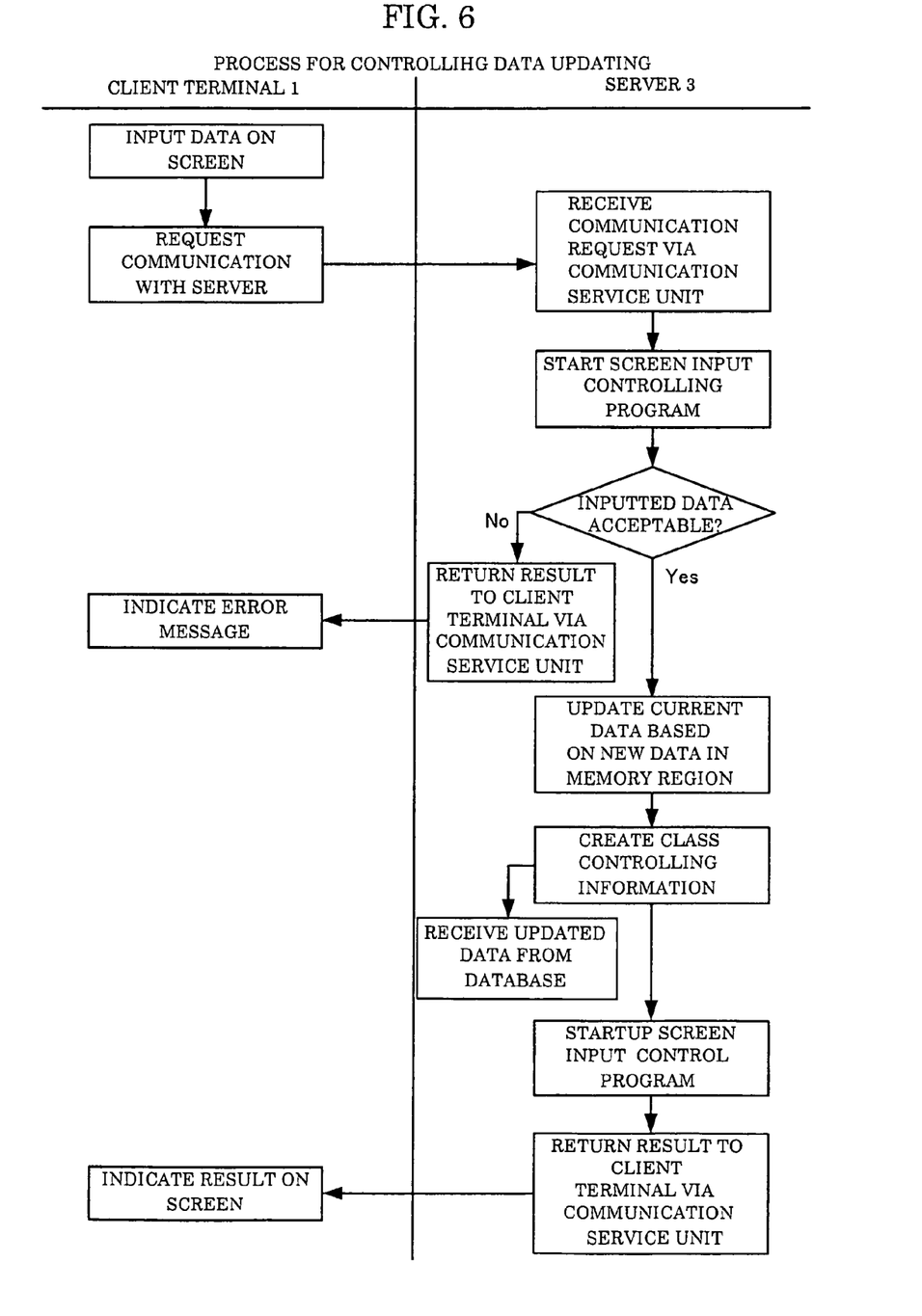
FIG. 6 is a flowchart showing a process for controlling data updating.

FIG. 6 shows how data sent from the client terminal 1 are updated by using the application program. At the client terminal 1, the operator inputs □ on the monitor, the data to be updated, and presses the SEND or OK button. Then, the data to be updated are sent to the server 3 via the communication service unit 7. At the server 3, the communication control logic circuit 9 runs a screen input control program in order to check the contents of the received data. If the received data are not correct, they are returned to the client terminal 1 via the communication service unit 7. An error message will appear on the monitor of the client terminal 1.

Conversely, when the received data are correct, the corresponding data in the memory region are updated. The class information controlling region is created for each administrative region, so that data in a datable in the database server 20 will be updated.

Once the data are updated in the memory region, the data in the screen input control program will be also updated. Only the updated data will be returned to the client terminal 1 via the communication service unit 7, so that a screen reflecting the updated data is shown on the monitor of the client terminal 1.

It is assumed here that data to be updated are sent from the startup screen A of the client terminal 1A. The corresponding data in the memory region 4B are updated, and the class information controlling region 4C is created, and the data in the database server 20 are updated. Only the updated data are returned to the client terminal 1A, and are shown on the monitor of the client terminal 1A. When data to be updated are sent from the startup screen B of the client terminal 1A, the corresponding data in the memory region 5B are updated, and the class information controlling region 5C is created, and the data in the database server 20 are updated. The updated data are returned to the client terminal 1A, and are shown on the monitor of the client terminal 1A. Further, when data to be updated are sent from the startup screen C of the client terminal 1B, the corresponding data in the memory region 6B are updated, and the class information controlling region 6C is created, and the data in the database server 20 are updated. The updated data are returned to the client terminal 1B, and are shown on the monitor of the client terminal 1B.

According to the communication system having the foregoing configuration, when the client terminal 1 sends the communication request including data updating to the communication service unit 7 via the Internet 2, the data in the memory region corresponding to the communication request are updated, and are returned to the client terminal 1. The data are not updated page by page, but can be updated item by item, which is effective in reducing loads applied to the Internet 2, and improving responses and promoting usability of data communications between the client terminals 1 and the server 3 via the Internet 2.

What is claimed is:

1. A communication system applicable to communications between client terminals and a server, the system comprising:
single communication service means for creating a communication interface and a memory region in response to each request item in respective management regions when the server receives request items input from the client terminals and transmitted via the Internet, transmitting, to the client terminals, data acquired from a database server by an application program expanded corresponding to the request item in the created memory region and displaying the data on a screen of the client terminal; and
single application control means for expanding the application program into the memory region, and for creating, in each of the management regions, a database management region having a function for writing in, reading out and updating data for the database server,
wherein the communication service means has:

a function for creating the communication interface and the memory region in response to a new request item input from the client terminals;

a function for determining which communication interface and memory region in the server should be used to meet the request item input from the client terminals;

a function for performing a process for executing connection to the communication interface corresponding to the request item sent from the client terminals and transferring data thereto; and a function for sending a content processed by the server to a communication interface of a corresponding client terminal, and updates data of the application program expanded in the memory region which are required to be updated when the request item input from the client terminals has a request for updating the data of the application program which are displayed on the screen of the client terminals, and transmits only the updated data to the client terminals and displays the data on the screen of the client terminals, and the application control means creates the database management region in a management region in which the communication interface and the memory region are created by the communication service means when the communication service means receives the request item from the client terminals and acquires necessary data from the database server by the database management region, and stores the acquired data in a memory region of a management region corresponding to the database management region.

2. A communication method applicable to communications between client terminals and a server, the method comprising:

a first step of creating a communication interface and a memory region in response to each request item in respective management regions by single communication service means when the server receives request items input from the client terminals and transmitted via the Internet;

a second step of expanding each application program corresponding to the request item in the memory region created in the first step by single application control means;

a third step of creating a database management region having a function for writing in, reading out and updating data for a database server in a management region in which the communication interface and the memory region are created by the communication service means through the application control means, acquiring necessary data from the database server through the database management region and storing the acquired data in a memory region of a management region corresponding to the database management region; and a fourth step of transmitting the data acquired from the database server by the expanded application program to the client terminals and displaying the data on a screen of the client terminals through the communication service means, wherein the communication service means updates data of the application program expanded in the memory region which are required to be updated when the request item input from the client terminals has a request for updating the data of the application program which are displayed on the screen of the client terminals, and transmits only the updated data to the client terminals and displays the data on the screen of the client terminals.

3. A computer readable non-transitory storage medium storing a communication control program which executes the steps of:

creating a communication interface and a memory region in response to each request item in respective management regions when a server receives request items input from client terminals and transmitted via the Internet to the server by installation into the server;

expanding each application program corresponding to the request item in the created memory region;

creating a database management region having a function for writing in, reading out and updating data for a database server in the management region in which the communication interface and the memory region are created and acquiring necessary data from the database server by the database management region, and storing the acquired data in a memory region of a management region corresponding to the database management region;

transmitting the data acquired from the database server by the expanded application program to the client terminals and displaying the data on a screen of the client terminals;

updating data of the application program expanded in the memory region which are required to be updated when the request item input from the client terminals has a request for updating the data of the application program which are displayed on the screen of the client terminals; and transmitting only the updated data to the client terminals and displaying the data on the screen of the client terminals.

4. A non-transitory memory medium storing the program which is defined in claim 3 and is readable by a computer.

5. The communication system of claim 1, wherein the server receives a plurality of request items from a first client terminal.

6. The communication method of claim 2, wherein the server receives a plurality of request items from a first client terminal.

7. The computer readable non-transitory storage medium of claim 3, wherein the server receives a plurality of request items from a first client terminal.

8. The non-transitory memory medium of claim 4, wherein the server receives a plurality of request items from a first client terminal.

9. The communication system of claim 1, wherein each request item is one of: a request to communicate with the server, a request to send or receive authentication information, and a request for data from application programs.

10. The communication method of claim 2, wherein each request item is one of: a request to communicate with the server, a request to send or receive authentication information, and a request for data from application programs.

11. The computer readable non-transitory storage medium of claim 3, wherein each request item is one of: a request to communicate with the server, a request to send or receive authentication information, and a request for data from application programs.

12. The non-transitory memory medium of claim 4, wherein each request item is one of a request to communicate with the server, a request to send or receive authentication information, and a request for data from application programs.

* * * * *